C. N. ARMFIELD.
AXLE OILER.
APPLICATION FILED APR. 23, 1912.
1,182,443.
Patented May 9, 1916.
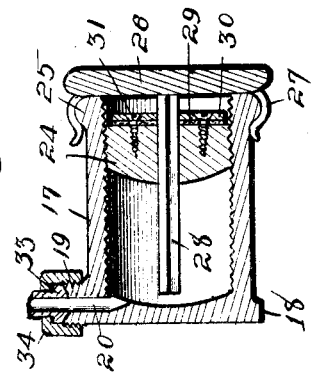
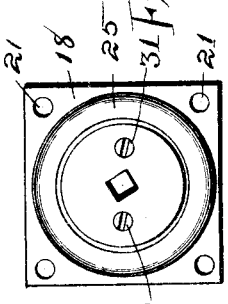
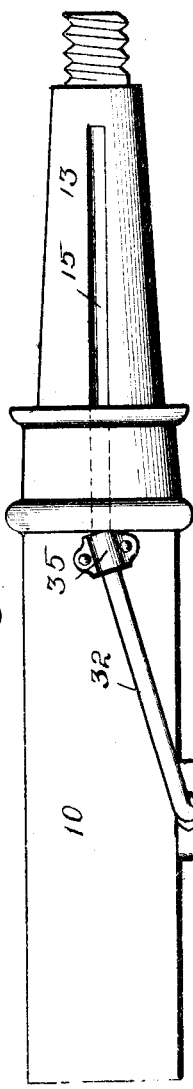
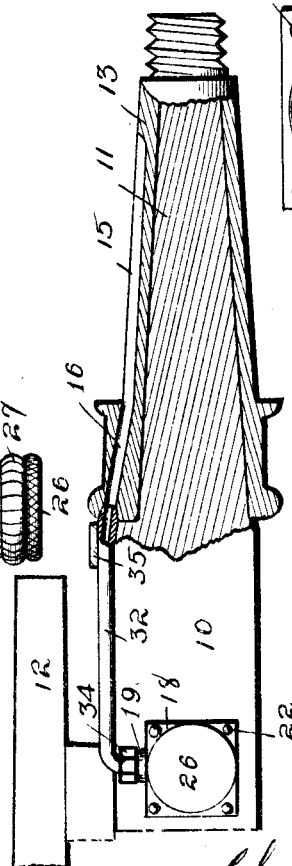
Witnesses.
A. G. Hague.
W. A. Loftus
Inventor.
Charles N. Armfield
by Orwig & Bair attys.

UNITED STATES PATENT OFFICE.

CHARLES N. ARMFIELD, OF GUTHRIE CENTER, IOWA.

AXLE-OILER.

1,182,443.

Specification of Letters Patent.

Patented May 9, 1916.

Application filed April 23, 1912. Serial No. 692,727.

*To all whom it may concern:*

Be it known that I, CHARLES N. ARMFIELD, a citizen of the United States, residing at Guthrie Center, in the county of Guthrie and State of Iowa, have invented a new and useful Axle-Oiler, of which the following is a specification.

The object of my invention is to provide an axle oiler of simple, durable and inexpensive construction, which is peculiarly adapted to be used with a wagon, which oiler includes a grease cup, adapted to be attached to the side of an axle at a point where it will not be interfered with by the sand board, or by articles dropped from the wagon bed.

A further object is to provide in an axle oiler, a grease cup having a plug mounted therein and having a detachable cap mounted thereon, so constructed and arranged with relation to the plug, that the rotation of said cap moves the plug inward or outward within the grease cup.

My invention consists in certain details, in the construction, arrangement and combination of the various parts of my device, whereby the objects contemplated are attained, as hereinafter more fully set forth, pointed out in my claim, and illustrated in the accompanying drawings, in which—

Figure 1 shows a top or plan view of a wagon axle, having installed thereon, an axle oiler embodying my invention. Fig. 2 shows a side elevation of the same, part of the axle and the skein thereon being shown in section. Fig. 3 shows a central, vertical, longitudinal, sectional view through the grease cup. Fig. 4 shows an end view of the grease cup, with the cap removed.

In the accompanying drawings, I have used the reference numeral 10 to indicate generally, a wagon axle, on the end of which is a tapered portion 11 and above which is a sand board 12. Mounted on the tapered portion 11 is a skein 13, which is preferably made with a longitudinal groove 15 in its upper surface and with an opening 16 extending from the upper or inner end of said groove through a portion of the skein to the inner end thereof, on its upper side. The upper or inner end of the hole or opening 16 is slightly enlarged or reamed out, as shown in Fig. 2.

For containing grease, I provide a grease cup 17, preferably made in the form of a hollow cylinder, closed at one end, and open at the other. At its closed end, the grease cup 17 is provided with a base 18 extending laterally from the cup. On the lower part of the grease cup is an outwardly extending, externally screwthreaded, cylindrical projection 19 through which extends an opening 20 communicating with the interior of the grease cup. In the base 18 are openings 21. The grease cup is secured to the axle by bolts 22 or other suitable means extended through the openings 21 and secured to the axle 10.

The interior of the grease cup 17 is screwthreaded, as shown in Fig. 3 and mounted therein, is an externally screwthreaded plug 24. At the open end of the cup 17 is formed a circumferential, annular, outwardly extending rib 25. Mounted on the cup 17 is a detachable cap or cover 26 provided with a plurality of spring clips 27 designed to yieldingly engage the rib 25. On the inner surface of the cap 26, is an angular stem 28 extending to position near the bottom of the grease cup and slidably but non-rotatably mounted in the plug 24. On the upper or outer surface of the plug 24 is a washer 29, above which is a second washer 30. The washers 29 and 30 are secured to the plug 24 by screws 31 or other suitable means. The washers 29 and 30 are provided with a central opening, designed to snugly or slidably receive the stem 28.

For conducting grease from the grease cup to the hole 16 and the groove 15, I provide a tube 32 at one end of which is an angular flange 33 which is placed adjacent to the extension 19 and is held in such a position by a screw cap 34. The outer end of the tube 32 is received in the enlarged end of the hole 16 and the tube 32 is secured in its position by means of a bracket 35.

In the practical use of my improved axle oiler, the grease cup and tube 32 are installed on the axle. The detachable top and the plug are removed from the grease cup which is then filled with grease. The plug is screwed in and the cap is placed in position. After running a vehicle a certain length of time the cap may be rotated and the grease thereby forced through the tube 32 to the skein. My axle oiler has the advantage of rotating the grease cup at a point where it is not interfered with by the sand board or other parts of the wagon and where articles dropped from the wagon cannot injure the cup. The grease in the cup may be forced to the skein without removing the top of the cup. The user can tell when the grease is exhausted in the cup on account of the fact that the cap cannot be rotated when the plug reaches the bottom of the cup.

I claim as my invention:

In an oiling device comprising a cylindrical grease cup internally screw-threaded having an open and a closed end, and provided with a passage at its closed end, a screw-threaded plunger mounted in the interior of said grease cup, said plunger being provided with an angular central opening, a cap mounted on said cup, the cup and cap being provided with coacting means for rotatably mounting the cap on the cup, and to prevent the removal of the cap from the cup, an angular shaft mounted on the cap extended through the opening in the plunger, a washer on the side of said plunger adjacent to the cap, and means for detachably mounting said washer on the plunger, said washer having an opening to permit the passage of said shaft.

Des Moines, Iowa, April 9, 1912.

CHARLES N. ARMFIELD.

Witnesses:
N. K. DEWEY,
FRANK C. BELL.